United States Patent
Nitheanandan

(10) Patent No.: US 11,081,245 B2
(45) Date of Patent: Aug. 3, 2021

(54) TEST APPARATUS AND INSTRUMENTED CONDUIT FOR USE WITH SAME

(71) Applicant: Atomic Energy of Canada Limited, Chalk River (CA)

(72) Inventor: Thambiayah Nitheanandan, Deep River (CA)

(73) Assignee: Atomic Energy Of Canada Limited, Chalk River (CA)

( * ) Notice: Subject to any disclaimer, the term of this patent is extended or adjusted under 35 U.S.C. 154(b) by 523 days.

(21) Appl. No.: 15/769,942

(22) PCT Filed: Oct. 21, 2016

(86) PCT No.: PCT/CA2016/051224
§ 371 (c)(1),
(2) Date: Sep. 24, 2018

(87) PCT Pub. No.: WO2017/066881
PCT Pub. Date: Apr. 27, 2017

(65) Prior Publication Data
US 2018/0315513 A1    Nov. 1, 2018

(51) Int. Cl.
*G21C 17/112* (2006.01)
*G21C 17/10* (2006.01)
(Continued)

(52) U.S. Cl.
CPC ............ *G21C 17/112* (2013.01); *G01D 11/24* (2013.01); *G01K 1/143* (2013.01); *G01K 7/04* (2013.01);
(Continued)

(58) Field of Classification Search
CPC .... G21C 17/112; G21C 17/102; G01D 11/24; G01K 1/143; G01K 7/04; G01K 13/02; G01K 2013/026; Y02E 30/30
See application file for complete search history.

(56) References Cited

U.S. PATENT DOCUMENTS

| 3,051,641 A | 8/1962 | Gunerante |
| 3,691,840 A * | 9/1972 | Dufour ............... G01K 13/022 136/230 |

(Continued)

FOREIGN PATENT DOCUMENTS

| CN | 103852178 | 6/2014 |
| GB | 2072844 | 10/1981 |
| WO | 98/12417 | 3/1998 |

OTHER PUBLICATIONS

Chow C.K. "Conceptual Fuel Channel Designs for CANDU SCWR", Nuclear Engineering and Techno., vol. 40, No. 2, Jan. 1, 2008, pp. 139-146.

(Continued)

*Primary Examiner* — Nathaniel T Woodward
*Assistant Examiner* — Philip L Cotey
(74) *Attorney, Agent, or Firm* — Kevin Shipley; Fogler, Rubinoff LLP

(57) ABSTRACT

A conduit can include a sidewall and at least a first cavity can be disposed in the sidewall. The first cavity may include a first base surface portion and an opposing first cover surface portion disposed radially between the first base surface portion and the first inner surface so that a first portion of the sidewall is provided radially between the first cover surface portion and the inner surface. A first aperture may be in communication with the first cavity and may be axially spaced apart from the first cover surface portion. A first sensor may have a transducer portion insertable through the first aperture and positioned within the first cavity. The transducer portion may be disposed radially between the first base surface portion and the first cover surface portion and being axially spaced apart from the first aperture.

20 Claims, 5 Drawing Sheets

(51) Int. Cl.
*G01K 1/143* (2021.01)
*G01K 13/02* (2021.01)
*G01D 11/24* (2006.01)
*G01K 7/04* (2006.01)

(52) U.S. Cl.
CPC ........... *G01K 13/02* (2013.01); *G21C 17/102* (2013.01); *G01K 13/026* (2021.01)

(56) References Cited

U.S. PATENT DOCUMENTS

| | | | | |
|---|---|---|---|---|
| 5,331,676 | A * | 7/1994 | Lambert | G21C 21/02 |
| | | | | 376/260 |
| 6,390,670 | B1 * | 5/2002 | Nimberger | C08L 79/08 |
| | | | | 374/142 |
| 7,249,885 | B2 * | 7/2007 | Van Den Ende | F28F 27/00 |
| | | | | 374/147 |
| 7,668,281 | B2 * | 2/2010 | Balog | G21C 19/34 |
| | | | | 376/260 |
| 8,417,084 | B2 | 4/2013 | Stoesz et al. | |
| 9,196,387 | B2 * | 11/2015 | Goszczynski | G21C 17/06 |
| 2009/0285345 | A1 * | 11/2009 | Balog | G21C 19/32 |
| | | | | 376/260 |
| 2010/0092595 | A1 | 4/2010 | Gunther | |
| 2010/0284505 | A1 * | 11/2010 | King | G21C 17/00 |
| | | | | 376/258 |
| 2010/0290502 | A1 * | 11/2010 | Cubizolles | G01K 1/143 |
| | | | | 374/141 |
| 2013/0114777 | A1 * | 5/2013 | Goszczynski | G21C 17/06 |
| | | | | 376/247 |
| 2014/0362966 | A1 * | 12/2014 | Fushimi | G01T 3/006 |
| | | | | 376/254 |
| 2015/0098486 | A1 | 4/2015 | McMillon | |

OTHER PUBLICATIONS

Extended European search result in EP 16856828.1, dated May 22, 2019.
IPRP issued on PCT/CA2016/051224 dated May 3, 2018.

* cited by examiner

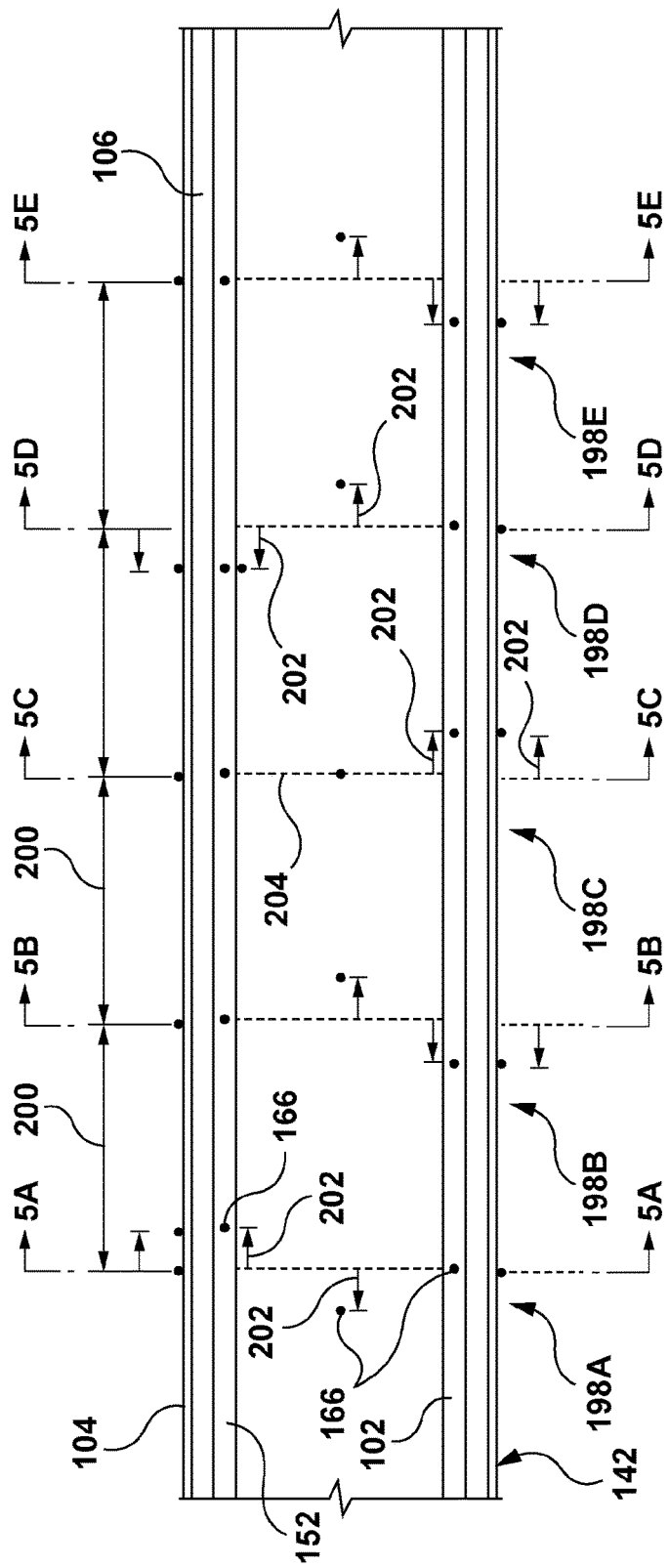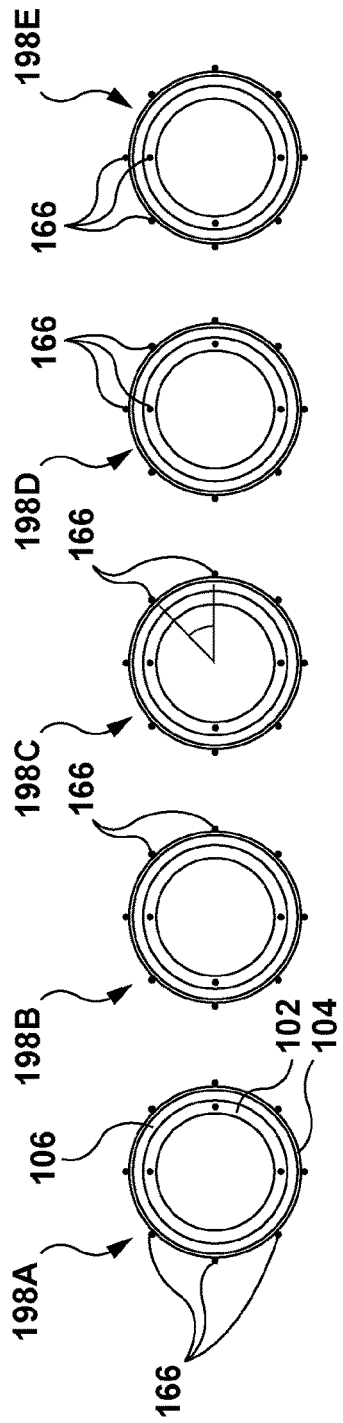

TEST APPARATUS AND INSTRUMENTED CONDUIT FOR USE WITH SAME

CROSS-REFERENCE TO RELATED APPLICATIONS

This application claims the benefit U.S. Provisional Application No. 62/245,692 filed Oct. 23, 2015 and entitled Test Apparatus and Instrumented Conduit for Use With Same, the entirety of which is incorporated herein by reference.

FIELD

The present subject matter of the teachings described herein relates generally a combination of a conduit and a sensor that can be used in a test apparatus or in a non-test environment.

BACKGROUND

The CANDU fuel channel safety assessment can be performed using validated computer codes. The validation of the safety analysis codes can be improved by using reliable experimental data to ensure codes are able to predict the temperature of the pressure tube when it deforms due to overheating and internal pressure. It can be difficult to measure the temperature of the pressure tube.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

In accordance with one aspect of the teachings disclosed herein, a combination of a conduit and a sensor can include a conduit extending along a conduit axis between a first end and a second end. The conduit can include a sidewall with an inner surface and an opposed outer surface spaced apart from the inner surface in a radial direction. At least a first cavity can be disposed in the sidewall. The first cavity may include a first base surface portion and an opposing first cover surface portion disposed radially between the first base surface portion and the first inner surface so that a first portion of the sidewall is provided radially between the first cover surface portion and the inner surface. A first aperture may be provided in the inner surface. The first aperture may be in communication with the first cavity and may be axially spaced apart from the first cover surface portion. A first sensor may have a transducer portion insertable through the first aperture and positioned within the first cavity. The transducer portion may be disposed radially between the first base surface portion and the first cover surface portion and being axially spaced apart from the first aperture.

The first cavity may extend along a first cavity axis between a first end comprising the first aperture in the sidewall and a closed, second end that is spaced apart from the first end, the first cavity axis is inclined at a cavity angle relative to the conduit axis.

The first cavity angle may be between about 20 and about 70 degrees, and may be 45 degrees.

The first cavity and the first aperture may be part of a common linear bore formed in the conduit sidewall.

The bore may have a bore diameter that is between about 0.2 mm and about 1.0 mm.

The sidewall may have a thickness in the radial direction and the transducer portion is spaced apart from the inner surface by a transducer offset distance that is between about 40% and about 80% of the thickness.

The first sensor may include a lead portion connected to the transducer and extending through the first aperture and along the inner surface from the first cavity toward the first end of the conduit.

The first cavity may be located a first distance from the first end of the conduit and the lead may have a length that is greater than the first distance.

The lead may occupy substantially all of the cross-sectional area of the cavity.

The first sensor may include an Inconel-clad type K thermocouple provided with magnesium oxide thermal insulation.

A second cavity may be disposed in the sidewall and may be circumferentially spaced apart from the first cavity. The second cavity may include a second base surface portion and an opposing second cover surface portion disposed radially between the second base surface portion and the inner surface so that a second portion of the sidewall is provided radially between the second cover surface portion and the inner surface. A second aperture may be provided in the inner surface. The second aperture may be in communication with the second cavity and may be axially spaced apart from the second cover surface portion. A second sensor may have a second transducer portion that is insertable through the second aperture and positioned within the second cavity. The second transducer portion may be disposed radially between the second base surface portion and the second cover surface portion and may be axially spaced apart from the second aperture.

The conduit may have a conduit length and a conduit diameter and a ratio of the conduit length to the conduit diameter may be between about 8:1 and about 50:1.

In accordance with another aspect of the teaching disclosed herein, that may be used alone or in combination with any other aspects, a test apparatus may include an first conduit extending along a conduit axis and having a first sidewall with a first inner surface and an opposing first outer surface spaced apart from the first inner surface in a radial direction. A second conduit may be disposed within the first conduit and may include a second sidewall with a second inner surface and an opposed second outer surface radially spaced apart from and facing the first inner surface. A heater may be disposed within the second conduit. At least a first cavity may be disposed in the second sidewall. The first cavity may include a first base surface portion and an opposing first cover surface portion disposed radially between the base surface portion and the first inner surface so that a first portion of the second sidewall is provided radially between the first cover surface portion and the heater. A first aperture may be provided in the second inner surface. The first aperture may be in communication with the first cavity and may be axially spaced apart from the first cover surface portion. A first sensor may have a transducer portion that may be insertable through the first aperture and may be positioned within the first cavity. The transducer portion may be disposed radially between the first base surface portion and the first cover surface portion and being axially spaced apart from the first aperture whereby the first portion of the sidewall shields the transducer from heat radiating from heater.

The first cavity may extend along a first cavity axis between a first end comprising the first aperture in the second sidewall and a closed, second end that is spaced apart from the first end. The first cavity axis may be inclined at a cavity angle relative to the conduit axis.

The first cavity angle may be between about 20 and about 70 degrees and may be 45 degrees.

The first cavity and the first aperture may be part of a common linear bore formed in the second sidewall.

The bore may have a bore diameter that is between about 0.2 mm and about 1.0 mm.

The second sidewall may have a thickness in the radial direction and the transducer portion may be spaced apart from the second inner surface by a transducer offset distance that is between about 40% and about 80% of the thickness.

The first sensor may include a lead portion connected to the transducer and extending through the first aperture and along the second inner surface from the first cavity toward an end of the second conduit.

The first cavity may be located a first distance from the end of the second conduit and the lead may have a length that is greater than the first distance.

The second conduit may be coaxially positioned with the first conduit.

The heater may include an elongate rod heater extending along a heater axis. The heater axis may be parallel to and spaced apart from the conduit axis.

A first external sensor may be provided on the first outer surface and may overlie the first sensor The second outer surface may directly face the first inner surface. An annular gap may be defined between the second outer surface and the first inner surface and may be free from obstructions.

A vessel may contain a liquid and at least a portion of the first conduit may be submerged in the liquid.

An interior of the inner conduit may be sealed and a gas supply may be connected to the interior of the inner conduit to pressurize the interior of the inner conduit.

In accordance with another broad aspect of the teachings disclosed herein, which may be used alone or in combination with any other aspects, a method of making an instrumented elongate conduit may include:

a) axially inserting a tool into an interior of an elongate conduit, the tool comprising a boring tool;

b) forming a bore in a sidewall of the conduit using the a boring tool, the bore extending from an aperture in an inner surface of the sidewall to a closed end within the sidewall and comprising a cavity that is axially spaced apart from aperture and has a base surface portion and a cover surface portion positioned radially between the base surface portion and the inner surface of the conduit;

c) inserting a transducer portion of a sensor through the aperture and into the cavity; and d) positioning the transducer portion within the cavity to be radially between the base surface portion and the cover surface whereby a portion of the sidewall is disposed radially between the transducer portion and the inner surface.

The method may include inserting a camera into the conduit to locate a pre-marked target location and aligning the boring tool with the pre-marked target location.

The boring tool and camera may both be mounted on a head portion of the tool.

The method may include locking the boring tool to the conduit to inhibit axial movement of the boring tool relative to the conduit before forming the bore.

Locking the boring tool may include extending at least two locking pins from the tool to bear against the inner surface of the conduit, and unlocking the boring tool comprises retracting the clamps away from the inner surface.

The clamps and boring tool can both provided on a head portion of the tool.

The tool may include a display module that is spaced apart from boring tool and remains external the conduit while forming the bore.

The boring tool may include an electro discharge machining apparatus.

DRAWINGS

The drawings included herewith are for illustrating various examples of articles, methods, and apparatuses of the teaching of the present specification and are not intended to limit the scope of what is taught in any way.

In the drawings:

FIG. 4 is a cross-sectional view of the pressure tube and calandria tube from the test apparatus of FIG. 1;

FIGS. 5A to 5E are schematic cross-sectional views taken at different locations along the tubes of FIG. 4.

DETAILED DESCRIPTION

Figure 1:
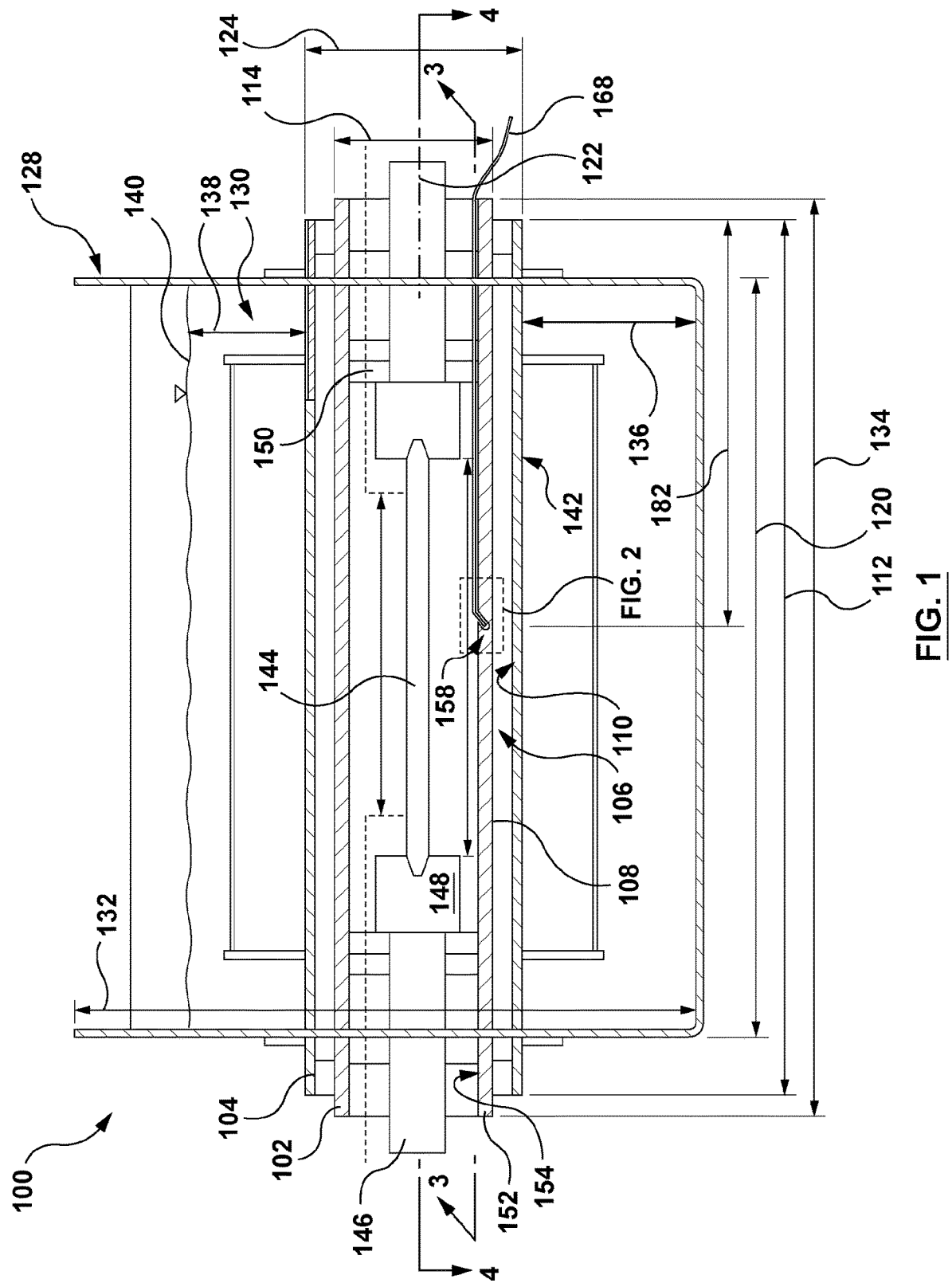
FIG. 1 is a cross-sectional view of one example of a test apparatus.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Sensors can be used to monitor a variety of properties of an underlying object. For example, contact-based temperature sensors, such as thermocouples, may be used to measure the temperature of an object, such as a pipe or other conduit. Further, in some instances the accuracy of surface-mounted sensors may be compromised by environmental factors such as the ambient temperature, the presence of thermal radiation, convective air currents and the like. For example, if a temperature sensor is positioned between a source of heat and a surface that is being heated, the output of the sensor may not accurately reflect the temperature of the surface, but instead may be influenced by thermal energy emitted by the heat source.

One example of situation in which obtaining temperature measurements can be challenging is the experimental testing of the fuel channels of a pressure-tube type nuclear reactor, such as a CANDU® reactor designed by Atomic Energy of Canada Limited. While the teachings described herein are explained with reference to the testing of fuel channels, one or more aspects of these teachings may be used in other situations and in combination with other types of testing or non-testing, practical applications, in a variety of industries.

One example of a fuel channel testing apparatus is an apparatus that can be used to conduct a contact boiling test. For at least some aspects, CANDU® fuel channel safety assessments can be performed using validated computer models that can model and predict the behavior of the fuel channels under a variety of simulated operating conditions. Validation of the computer models used for safety analysis can be assisted by gathering generally reliable experimental data and then verifying that the temperatures generated by the computer models matches the temperatures observed in the experiment.

In the embodiment described herein, the fuel channel includes a nested-tube like structure, in which a first conduit in the form of a pressure tube is positioned within a surrounding second conduit, referred to herein as a calandria tube. When a complete fuel channel is installed within a reactor, the pressure tube is configured to receive nuclear fuel bundles and to channel a flow of coolant liquid that is in contact with and is heated by the fuel bundles. During operation, the pressure tube is therefore heated from within, as well as being subjected to internal pressures exerted by the coolant liquid, and is irradiated by the nuclear fuel source. This combination of factors can make it difficult to model the temperatures, deformation and other behavior of the pressure tube under accident conditions when either the coolant flow is reduced or absent. In these accident conditions, the coolant liquid becomes a vapor (commonly referred to as steam). To help evaluate the performance of a fuel channel under different accident conditions, contact boiling test apparatus can include a section of a fuel channel that can be subjected to a variety of accident scenarios in a controlled environment. In addition, for experimental purposes nuclear fuel bundles are replaced with a non-radioactive heat source (such as an electric heater) and the coolant vapor (steam) is replaced with a suitable replacement fluid, such as an inert gas.

One example of a contact boiling test apparatus 100 is illustrated in FIG. 1. In this example, the test apparatus includes a section of pressure tube 102 that is positioned within a corresponding section of calandria tube 104. In this configuration, an annular region 106 is defined between an outer surface 108 of the pressure tube 102 and the inner surface 110 of the calandria tube 104.

The pressure tube 102 may be made from and suitable material, including steel, steel alloys, zirconium based alloys and other metals and in the illustrated example is a Zr 2.5% Nb pressure tube. The pressure tube 102 may be of any suitable length, diameter and wall thickness as desired for a particular test or practical in service application. For example, in a testing environment the pressure tube 102 may have a length 112 that is between about 100 mm and about 2500 mm or more, and may be between about 500 mm and about 2000 mm or between about 1250 mm and about 1800 mm. In the illustrated example, the pressure tube extends along an axis and has a length of about 1750 mm.

Similarly, the pressure tube diameter 114 may be any suitable diameter, and may be between about 50 mm and about 1000 mm or more, and may be between about 90 mm and about 300 mm, and in the illustrated example is about 100 mm. In some embodiments, the a ratio of length 112 to diameter 114 can be between about 8:1 and about 50:1

Figure 3:
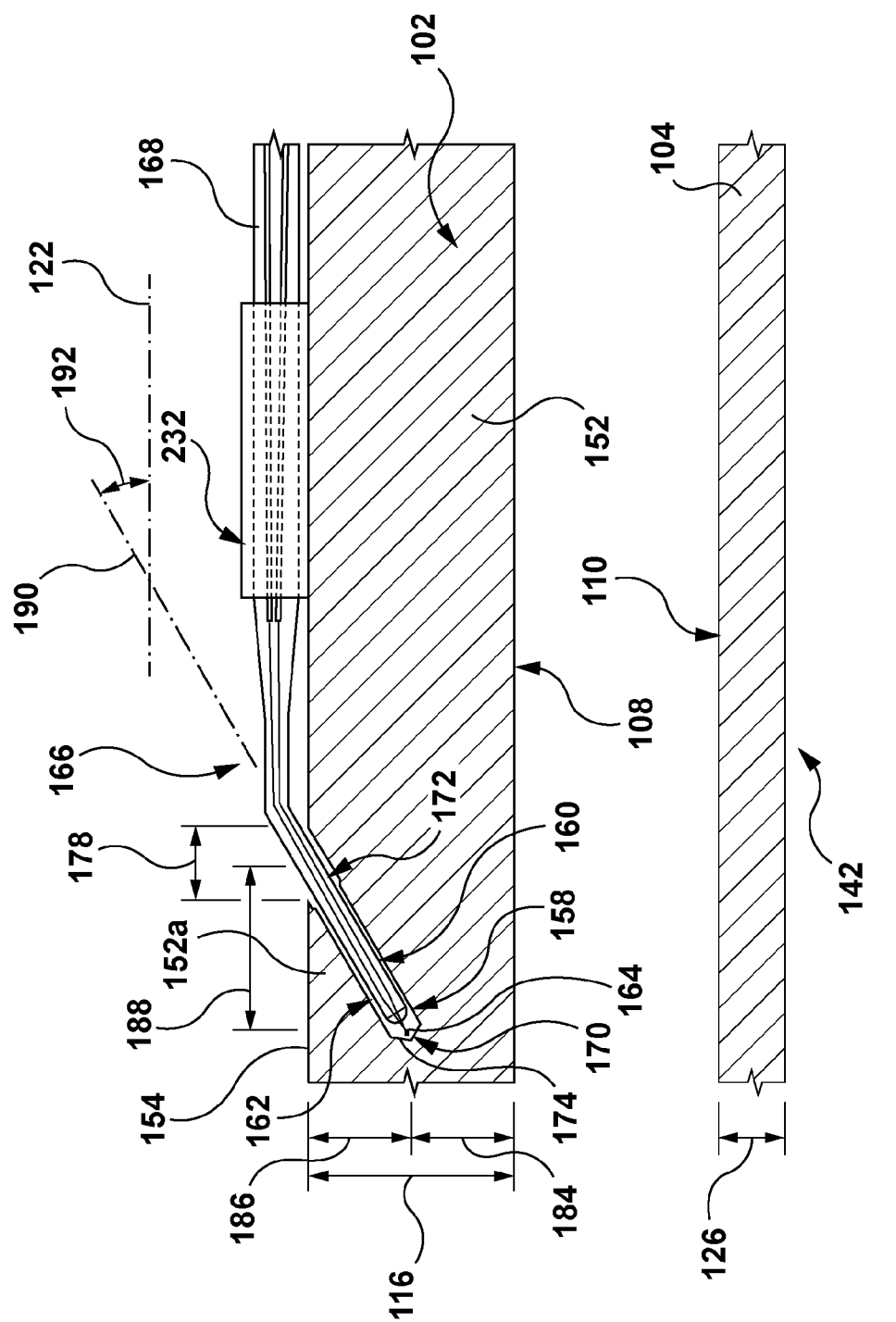
FIG. 3 is a cross-sectional view of a portion of the pressure tube and calandria tube from the test apparatus of FIG. 1.

Referring also to FIG. 3, the wall thickness of the pressure tube may be selected based on the type of experiment to be performed and/or to generally match the thickness of a pressure tube used in CANDU® reactors. The wall thickness 116 can be between about 3 mm and about 30 mm, and may be between about 4 mm and 10 mm, and in the illustrated example is between about 4 mm and about 4.5 mm.

Referring to FIG. 1, the calandria tube 104 may be made from any suitable materials including steel, steel alloys, zirconium based alloys and other metals and in the illustrated example is formed from Zircaloy 2. The calandria tube 104 may be of any suitable length, diameter and wall thickness as desired for a particular test or practical/in service application. For example, in a testing environment the calandria tube 104 may have a length that is between about 100 mm and about 2500 mm or more, and may be between about 500 mm and about 2000 mm or between about 1250 mm and about 1800 mm. In the illustrated example, the calandria tube 104 extends along an axis 122 and has a length 120 of about 1700 mm. In this configuration, to help facilitate connecting the test equipment, the pressure tube 102 is slightly longer than the calandria tube 104.

Similarly, the calandria tube diameter 124 may be any suitable diameter, and may be between about 50 mm and about 1200 mm or more, and may be between about 100 mm and about 350 mm, and in the illustrated example is about 132 mm. Referring to FIG. 3, the calandria tube has a thickness 126 that is less than the pressure tube thickness 116. Alternatively, in other embodiments the calandria tube thickness 126 may be equal to or greater than the pressure tube thickness 116.

Referring to FIG. 1, in the illustrated example, to conduct the desired contact boiling test the nested tubes 102 and 104 are then positioned within a containment vessel 128 that holds a liquid 130 that is used to simulate the presence of a moderator in a CANDU® reactor. In this configuration, both the pressure tube 102 and caldaria tube 104 are generally free to expand radially and axially during the heating and testing process.

In the illustrated example, the vessel 128 is open to the atmosphere and the liquid is distilled light water, but other suitable liquids could be used in other experiments. The water can be heated using any suitable heater (not shown) so that it is at the temperature desired for a given experiment. The vessel 128 may be of any suitable size, and in the illustrated example has a height 132 of about 750 mm, a length 134 of about 1400 mm and a width of about 600 mm. The calandria tube 104 is positioned so that it is submerged within the water, and in the illustrated example is positioned at a height 136 that is about 425 mm above the bottom wall of the vessel and is offset a distance 138 of about 180 mm below the free surface 140 of the water. In other experiments, the vessel may be of a different size or configuration.

Optionally, at least a portion of the vessel 128 can be substantially transparent. This may allow visual observation and video recording of the interior of the tank, and specifically any boiling of the water that occurs on an outer surface 142 (see FIG. 3) of the calandria tube 104, when the apparatus 100 is in use.

In place of a nuclear fuel bundle, the apparatus 100 is provided with a heat source in the form of a graphite rod heater 144 and the interior of the pressure tube 102 is filled with a suitable, pressurized gas. Optionally, in some high pressure tests (for example where pressures inside the pressure tube 102 are >3 MPa) the heater 144 may be offset toward the bottom of the pressure tube. This offset may help reduce the magnitude of a free convection induced circumferential temperature gradient on the pressure tube 102 during heating. For example, in some operating conditions if the heater is concentrically positioned with the pressure tube 102, depending on the internal pressure, convection in the pressurizing gas may cause higher temperatures at the top of the pressure tube 102 than at the bottom of the pressure tube 102, which may be undesirable if the experiment apparatus is intended to provide uniform heating of the pressure tube 102. The location of the rod heater 144 within the pressure tube 102 can, accordingly, be selected based on the desired operating conditions for a given experiment.

The heater 144 may be held in place and powered using any suitable mounting and powering mechanisms. Referring to FIG. 1, in the illustrated example the heater rod 144 is held in place within the pressure tube by water-cooled stainless steel buss bars 146 with Zircaloy end fittings 148. Compression springs (not shown) can be used to keep the buss bars 146 in contact with the ends of the rod heater 144, and the end fittings 148 may be shaped to compliment the end shape of the rod heater 144. In the illustrated example, the ends of the rod heater 144 are tapered into a generally conical shape to match the generally conical receptacles in the end fittings 148. When the rod heater 144 is mounted in this manner it may be generally free to expand during heating.

Optionally, a remote gas source, such as a pressurized gas cylinder (not shown), may be used to equalize the pressure inside the pressure tube 102 and the buss bars 146. Optionally, the ends of the pressure tube can be provided with any type of suitable insulators 150 to help reduce the amount of heat transfer that occurs at the ends of the pressure tube. In the illustrated example, Zirconia disk insulators 150 are placed at the end of each endfitting 148 to help thermally insulate the pressure tube end-fitting assembly from the heater 144.

To conduct a contact boiling experiment, the pressure tube 102, calandria tube 104 and heater 144 can be submerged within the vessel 128, as illustrated in FIG. 1. The interior of the pressure tube 102 can then be filled with the inert gas and pressurized to the desired test conditions. While the interior of the pressure tube 102 is pressurized, the rod heater 144 can then be energized to heat the pressure tube 102. The rod heater 144 can be operated at any desired temperature and heat-up (ramp) rate for a given experimental set-up. In this configuration, the pressure tube 102 can be heated to the desired test temperatures, for example to temperatures between about 700 and about 1200 deg. C. to simulate boiling coolant conditions and/or other accident conditions within a CANDU® type reactor. As the pressure tube 102 is heated, thermal energy will be transferred from the pressure tube 102 to the calandria tube 104, through the annular gap 106, at a faster rate achieved primarily by radiation and convective heat transfer modes.

When the pressure tube 102 is sufficiently heated and internally pressurized, the pressure tube 102 may become plastic and may begin to yield and plastically deform. When arranged as illustrated in the present example, the pressure tube 102 may tend to expand radially outwardly into the annular gap 106, such that the diameter 114 of the pressure tube 102 increases and the outer surface 108 of the pressure tube moves radially toward the inner surface 110 of the calandria tube 104. Under some test conditions, the pressure tube 102 may expand such that its outer surface 108 physically contacts the inner surface 110 of the calandria tube 104. When physical contact is established, the rate of heat transfer from the pressure tube 102 to the calandria tube 104 may be achieved primarily by contact conductance heat transfer, and the rate of heat transfer to from the pressure tube 102 to the calandria tube 104 may increase to a higher rate.

For example, in the illustrated apparatus when the temperature of the pressure tube sidewall 152 reaches about 640 deg. C. the pressure tube 102 will become plastic, expand radially into the annular gap 106, and contact the calandria tube 104. Prior to and during this expansion process, the pressure tube 102 may absorb relatively large amounts of thermal energy, which is stored as sensible heat in the sidewall 152 of the pressure tube 102. When the pressure tube 102 eventually contacts the calandria tube 104 the accumulated thermal energy may be transferred quickly into the calandria tube 104 as a heat spike.

With sufficient heat transfer, the water in the vessel 128 that is in contact with the calandria tube 104 will begin to boil. If the difference between the water temperature and saturation temperature of water, calculated for the existing vessel 128 pressure, is large (i.e. to simulate a high degree of moderator sub-cooling) the heat transfer between the calandria tube 104 and the moderator liquid may tend to be efficient because of nucleate boiling on the calandria tube surface 142, maintaining calandria tube 102 temperatures low. If the temperature difference between the vessel 128 water and the saturation temperature is not sufficiently large, the water adjacent the outer surface 142 of the calandria tube 104 may tend to flash boil (called film boiling) which may create a vapour layer between the calandria tube 104 and the liquid. Formation of a vapour layer may reduce the rate of heat transfer from the calandria tube 104 to the water, and may cause the calandria tube 104 to heat which may lead to the failure of the calandria tube 104 and pressure tube 102. In non-test situations, failure of the pressure tube 102 and calandria tube 104 may result in the release of radioactive material.

When testing a pressure tube 102 in the manner described herein, measuring the internal temperature of the pressure tube sidewall 152 may be desirable. While the temperature of the rod heater 144 cannot be measured using known techniques, accurately measuring the temperature of the pressure tube sidewall 152 can also be challenging. One known technique for measuring the temperature of the pressure tube 102 includes mounting thermocouples on the interior surface 154 of the pressure tube sidewall 152 (FIGS. 1 and 3). Such surface mounted thermocouples can be exposed to direct thermal radiation emitted by the rod heater 144, and convective heat transfer from the gas within the pressure tube 102. Accordingly, the temperatures recorded by surface mounted thermocouples may be influenced by these external factors, and may not accurately reflect the actual temperature of the pressure tube sidewall 152. Covering such thermocouples with thermal shielding may help reduce the impact of the external factors on the temperature readings. However, the thermal shielding may also interfere with the desired heat transfer to the underlying portions of the pressure tube sidewall 152. This may lead to uneven heating of the pressure tube 102, which may affect the testing results.

Another technique for monitoring the pressure tube temperature is to mount thermocouples to the outer surface 108 of the pressure tube 102, within the annular gap 106. In such an arrangement the pressure tube sidewall 152 can shield the thermocouples from the direct radiation and convective heating factors. However, as the pressure tube 102 radially expands, the externally mounted thermocouples (and the leads associated therewith) can become trapped between the outer surface 108 of the pressure tube 102 and the inner surface 110 of the calandria tube 104. The presence of the thermocouples and their leads can then interfere with the physical contact between the pressure tube 102 and the calandria tube 104 and may cause a localized impediment of the conductance heat transfer between the pressure tube 102 and calandria tube 104. Altering the heat transfer between the tubes 102 and 104 may affect the accuracy of the experiment and may lead to less useful and/or less accurate results.

Figure 2:
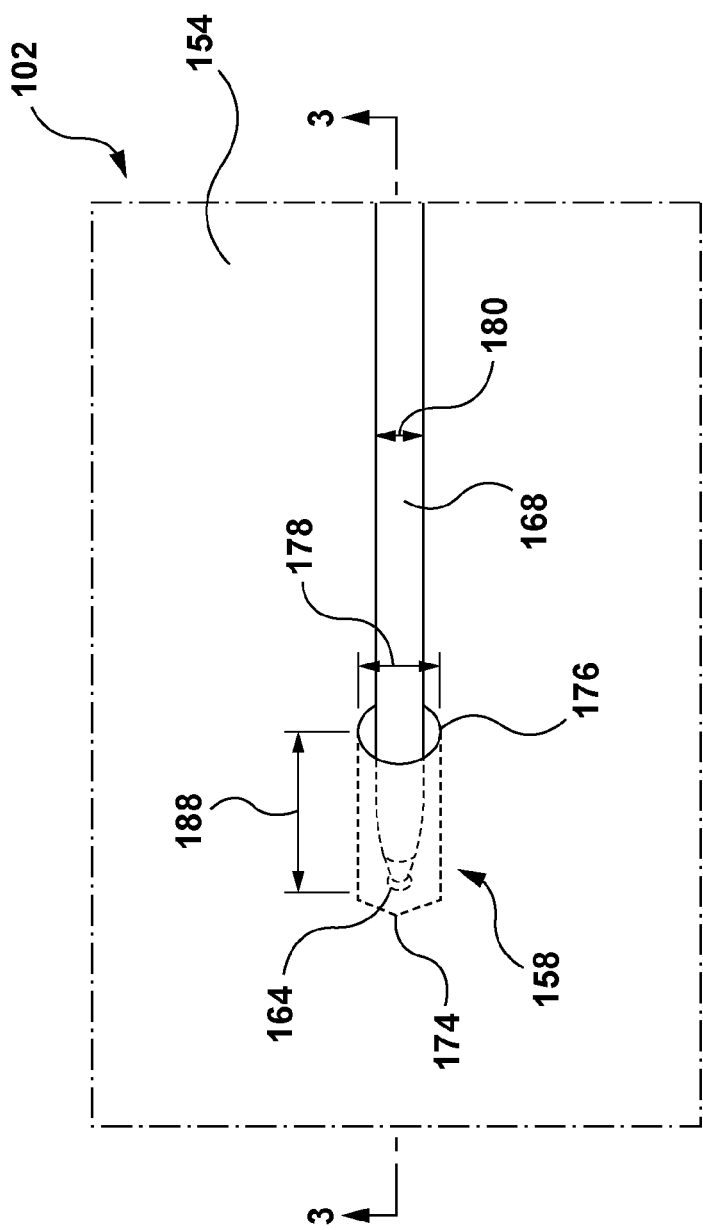
FIG. 2 is an enlarged view of a portion of a pressure tube from the test apparatus of FIG. 1.

Instead of these known techniques, the inventors have developed a new technique for instrumenting the pressure tube 102 that includes positioning the transducer portion of a sensor (i.e. the temperature sensing bead 164 of a thermocouple 166) within a cavity formed within the pressure tube sidewall 152, and positioning the leads 168 of the thermocouple 166 outside the annular gap 106. Referring to FIG. 1, one example of a cavity 158 is illustrated in the sidewall 152 of the pressure tube. FIGS. 2 and 3 illustrated the cavity 158 from in a top view and cross-sectional view, respectively.

In accordance with one aspect of the teachings described herein, the cavity 158 is embedded within the sidewall 152 of the pressure tube 102, such that a radially inner portion of the cavity 158 is covered by a portion of the sidewall material. This configuration may help shield the bead 164 of the thermocouple 166 within the cavity from being directly irradiated by thermal radiation emitted by the rod heater 144.

Referring to FIG. 3, preferably, the cavity 158 in the pressure tube sidewall is configured to have opposing base and cover surface portions 160 and 162 that are spaced apart from each other in the radial direction so that the transducer portion 164 are positioned radially between the base and cover surface portions 160 and 162. In such a configuration, a portion of the pressure tube sidewall 152 material, indicated using arrow 152a, may be located radially between the transducer portion 164 and the inner surface 154 of the pressure tube 102 (and therefore radially between the transducer portion and the rod heater). Embedding the transducer portion 164 in this manner may help shield the transducer 164 from the thermal radiation and convective-type heat transfer described herein. This may help reduce the influence of such external factors and may help facilitate obtaining an accurate measurement of the temperature of the pressure tube sidewall 152 itself. This configuration may also help facilitate direct measurement of the internal temperature of the pressure tube sidewall 152, which may help reduce the need for modeling or estimating the internal temperature based on surface temperature measurements.

Referring to FIG. 2, a top view of a portion of the pressure tube sidewall 152 illustrates an aperture 176 that is formed in the inner surface 154 of the pressure tube sidewall 152. The aperture 176 forms one end of the cavity 158 that extends into the sidewall 152 and has a closed end (shown in dashed lines) that is disposed within the interior of the pressure tube sidewall 152. The cavity 158 is formed between the aperture 176 and the closed end 170. The aperture may have any suitable diameter 178, and may be between about 0.5 mm and about 5 mm or more, and in the illustrated example is about 0.6 mm.

Referring also to FIG. 3, in the illustrated example, the internal cavity 158 is provided toward the closed end 170 of a bore 172 that is formed in the sidewall 152 and extends from the aperture 176 to a closed cavity endwall 174. In this configuration, the cavity endwall 174 extends between the base surface portion 160 and cover surface portion 162 and is at the end of cavity 158, which is open on the side in communication with the aperture 176.

In the illustrated example, the bead 164 and the Inconnel lead 168 of a thermocouple sensor 166 can be inserted through the aperture 176 and into the cavity 158. When the bead 164 is positioned within the cavity 158, the bead 164 is radially covered by the cover surface portion 162 and the portion of the sidewall material 152a, such that it is not directly, radially visible or exposed, and is at least partially shielded from radially radiated thermal energy emitted from the rod heater 144.

The thermocouple 166 also includes the lead portion 168 that extends from the bead 164 and can be connected to an external data acquisition system or data logger. Referring to FIG. 2, the lead portion 168 has a thickness 180, and the aperture 176 and lead portion 168 may be selected to be generally complimentary to each other. For example, the aperture 176 may be configured so that the diameter 178 is only slightly larger than the thickness 180. For example, the thickness 180 may be between about 80% and 99%, and between about 90% and 97% of the diameter 178. In the illustrated example, the lead portion 168 substantially fills the aperture 176. This may help inhibit thermal radiation and/or convective fluid flows from entering the cavity 158 via the aperture 176, which may help shield the bead 164. Shielding the bead 164 in this manner may help reduce the effect of the external radiation and convection factors on the temperature readings taken by the bead 164. Optionally, in some configurations the thickness 180 may be equal to or greater than the diameter 178, such that there is an interference fit between the lead portion 168 and the aperture 176.

Referring to FIG. 1, in the illustrated example the cavity 158 is spaced inwardly from one end of the pressure tube 102 by an axial insertion length 182. While the insertion length 182 is illustrated for only one cavity 158 for clarity, each cavity may have a varying insertion length depending on the axial location if the pressure tube includes more than one cavity. If the pressure tube 102 expands during the test its cavity length 182 may increase. To help accommodate such expansion, each of the leads 168 are configured to have a respective length that is greater than the insertion length 182 of the cavity 158 to which they are connected. In this arrangement, the leads 168 may be slack before the test begins (i.e. may have a curved or wavy configuration as opposed to a linear configuration), and the slack may be taken up as the pressure tube 102 expands. This may help reduce the likelihood of a lead 168 being placed under tension as the pressure tube 102 expands, which may help reduce the chances of a sensor being damaged or becoming dislodged from its cavity 158 during expansion of the pressure tube 102.

The leads 168 may be attached to the inner surface 154 of the pressure tube 102 in a desired manner and at desired interval. Preferably the leads 166 are attached in a manner that portions of the leads 168 between adjacent attachment points are slack prior to testing, so that they can accommodate the expansion of portions of the pressure tube 102 between the attachment points.

Optionally, the cavity 158 can be positioned in any suitable location within the sidewall 152 of the pressure tube 102. For example, the cavity 158 can be located toward the inner surface 154, toward the outer surface 108, or as illustrated, approximately in the middle of the sidewall 152. In the illustrated example, a radial distance 184 between the outer surface 108 of the pressure tube 102 and cavity 158 (represented as approximately the position of the bead within the cavity) is about 50% of the sidewall thickness 116, but alternatively may be between about 5% and about 95%, and between about 20% and about 70% of the thickness 116. Reducing the radial distance 184 may help reduce the influence of the external radiation and convention heat transfer factors on the temperature readings taken by bead 164. In this configuration, the distance 186 between the transducer portion 164 positioned within the cavity 158 and the inner surface 154 of the pressure tube 102 can be between about 5% and 95% of the thickness 116, between about 40% and about 80% of the thickness 116, and in the illustrated example is about 50% of the thickness 116 (i.e. in this example the bead is generally radially centred between the cover and base surfaces).

Preferably, a sufficient amount of material is left between the base surface portion 160 and the outer surface 108 to help maintain the structural integrity of the pressure tube 102 so that it will behave as expected during the test procedure, and will not locally fail prematurely. The amount of material required between the base surface portion 160 and the outer surface 108 may be determined based on a variety of factors, including the material of the pressure tube and the expected operating temperatures and pressures a given experiment.

Referring also to FIG. 2, similarly, the axial distance 188 between the aperture 176 (measured from its centre point) and the cavity 158 (measured to the location of the bead 164) can optionally be greater than the diameter 178 of the aperture 176, and may be between about 100% and about 300% or more of the diameter 178, and may be between about 150% and about 250% of the diameter 178. Referring to FIGS. 2 and 3, in the illustrated example the axial distance is about 200% of the aperture diameter 178. Increasing the axial offset distance 188 may help reduce the influence of the external radiation and convention heat transfer factors on the temperature readings taken by bead 164.

Optionally, as illustrated, the bore 172 extending between the aperture 176 and the cavity 158 can be a generally linear bore that extends along a bore axis 190 (FIG. 3). In the illustrated example the bore axis 190 intersects the cavity 158 and the aperture 176, and passes through the transducer portion 164 of the thermocouple 166. To help facilitate the positioning of the cavity 158 within the sidewall (for example to provide the desired radial and axial offset distances 184 and 188); the bore axis 190 may be inclined relative to the pressure tube axis 122 by any suitable cavity angle 192. For example, the cavity angle 192 may be between about 20 degrees and about 70 degrees, may be between about 35 degrees and about 60 degrees, and in the illustrated example is about 45 degrees.

While a single cavity/thermocouple combination has been described in detail herein, each thermocouple 166 used in combination with the pressure tube side wall 152 may be provided with a similar, and optionally identical cavity.

Optionally, more than one thermocouple may be used in the experimental apparatus. For example, multiple thermocouples 166 may be embedded within the sidewall 152 of the pressure tube 102 at a variety of spaced apart locations. This may help facilitate measuring the temperature of the pressure tube 102 at different locations. Optionally, some of the thermocouples 166 may be axially spaced apart from each other along the length 112 of the pressure tube 102. Alternatively, or in addition to such spacing, thermocouples 166 can be generally axially aligned with each other, but may be spaced circumferentially from each other to provide groups of sensors formed in ring-like arrangement around the perimeter pressure tube 102. In some configurations, a pressure tube 102 may be instrumented such that it includes a plurality of such sensor rings that are axially spaced apart from each other. In addition to sensors on the pressure tube, additional sensors may be provided on the calandria tube (in any suitable manner and location) and in other locations around the vessel as desired.

Referring to FIG. 4, in the illustrated example the pressure tube 102 and calandria tube 104 are each instrumented with thermocouples 166 that are clustered together into five sensor rings 198A-E that are spaced from each other by a ring spacing distance 200 (about 150 mm in the illustrated example) along the desired test section of the tubes 102 and 104. The locations of the thermocouples 166 forming each of the rings 198A-E are illustrated schematically in the schematic cross-sectional drawings in FIGS. 5A-5E.

In the illustrated example, fifty-four thermocouples are used to monitor the test apparatus section temperature: fourteen embedded within the pressure-tube wall 152 as described herein, and forty on the outside surface 142 of the calandria tube 104. Optionally, as in the illustrated example, the thermocouples 166 that are grouped into a ring, for example ring 198C, can be slightly axially offset form a central ring plane 204, by a ring offset distance 202, while still being considered part of a common ring 198C. Preferably, the ring offset distance 202 is much less than the ring spacing distance 200, and optionally may be less than 25% of the ring spacing distance 200.

The fourteen thermocouples 166 on the pressure tube 102 may be of any suitable type and configuration, and in the illustrated example are special grade, special limits of error, 0.5 mm diameter, Inconel-clad with magnesium oxide (MgO) insulation, Type K thermocouples. The thermocouples 166 on the calandria tube 104 may also be any suitable type of thermocouple (either the same as or different from the pressure tube thermocouples) and in the illustrated example are special grade, special limits of error, Teflon®-insulated Type K thermocouples with sensing elements of 0.13 mm diameter. The tips of these thermocouple wires can be spot-welded directly onto the outer surface of the calandria tube 104 and form part of the five axial rings 198A-E.

While a particular set of tubes 102 and 104 has been illustrated in this example, aspects of the teachings herein may be used on tubes of different sizes, materials and configurations.

While illustrated as being in communication with the aperture 176, alternatively, or in addition to such an aperture described herein, the cavity 158 may be accessed via another suitable access path. For example, if the conduit sidewall at issue has sufficient wall thickness, a generally axial hole may be bored within the sidewall, starting from one of the exposed end faces of the conduit and boring within the sidewall to a pre-determined axial position. The sensor, such as a thermocouple, could then be axially inserted through the bore into a desired location within the sidewall. This configuration may also help shield the sensor from direct exposure to the heater or other environmental factors within the instrumented conduit, but may only be practical in some types of conduits and/or in some applications.

Optionally, the cavities described herein may be formed using any suitable tool or manufacturing technique. Preferably, the cavity is a closed-ended cavity as illustrated herein, and comprises a portion of a close-ended bore or a so called blind hole formed in the sidewall. Alternatively, the bore may be initially configured as a through-hole (for example, extending from the inner surface 154 to the outer surface 108 of the pressure tube 102) and then an outer portion of the bore can be filled in with suitable filler material to enclose the outer end of the bore.

When forming the cavity 158 as a close-ended cavity, the tool used to form the bore may need to be at least partially inserted within the pressure tube. If the bore 172 is spaced axially from the ends of the pressure tube 102, the tool may need to extend a substantial distance (for example at least 20% of the length of the pressure tube) within the interior of the pressure tube 102. If the pressure tube has a relatively small diameter 114, it may be difficult to position conventional cutting and/or drilling tools in the desired location.

Figure 6:
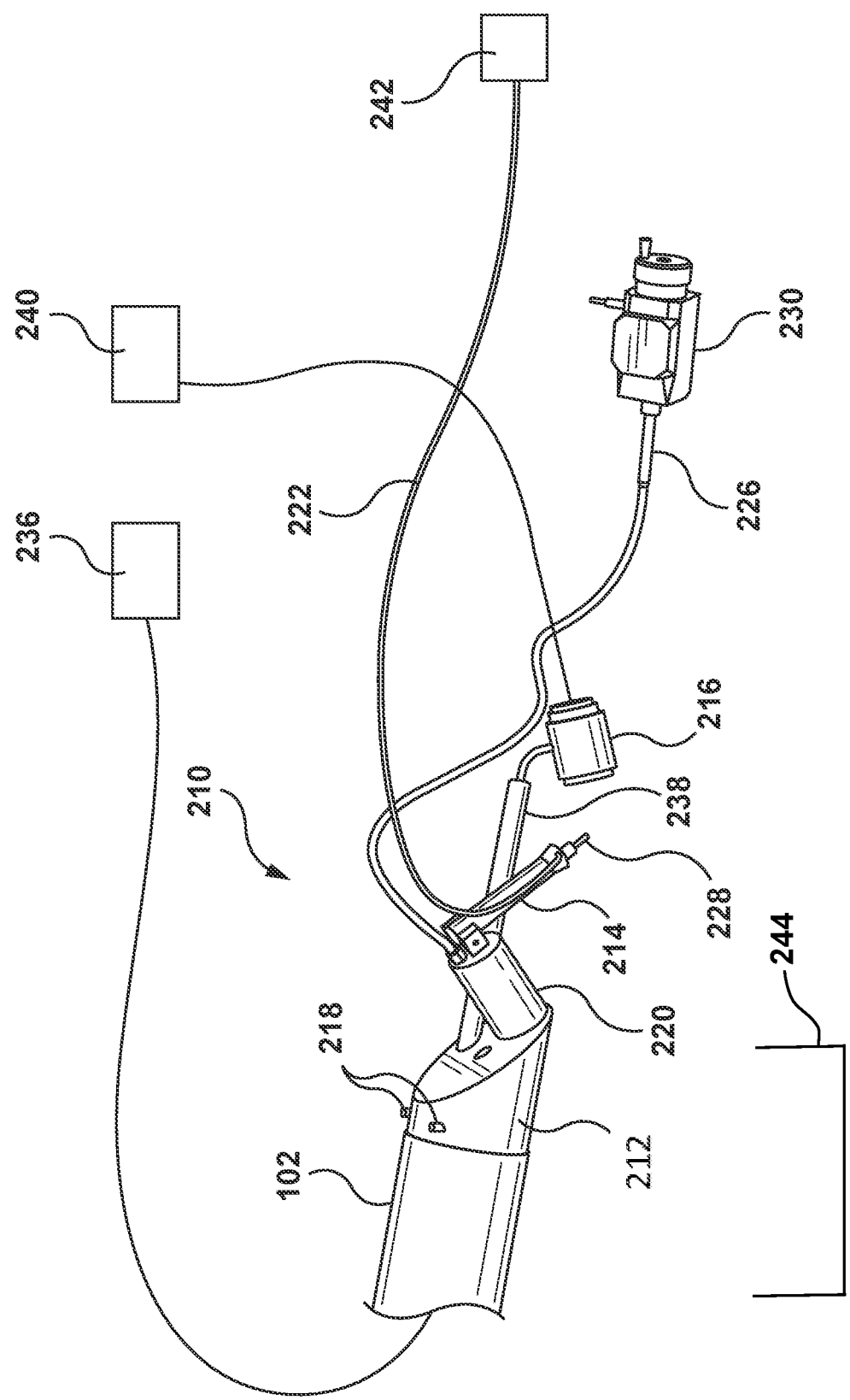
FIG. 6 is a perspective view of one example of a tool for forming cavities in a conduit wall.

Referring to FIG. 6, one example of a tool that can be used for installing a sensor within the wall of a conduit is illustrated. In the illustrated example, the tool 210 is adapted for installing thermocouples 166 within the sidewall 152 of the pressure tube 102, and is therefore sized and configured to be compatible with the pressure tube 102. The tool may have other configurations when used in combination with other types of conduits.

Preferably, the tool 210 includes a head 212 that is insertable within a given conduit (such as the pressure tube) and that includes a boring tool 214 and an alignment tool 216. Optionally, as illustrated in FIG. 6, the head 212 can be shaped to closely fit within a particular conduit, and in the illustrated example is generally cylindrical so as to fit within the pressure tube 102. Shaping the head 212 to closely match the inside of the conduit may help stabilize the head while the tool is in use, and may help reduce non-axial type of movements between the head and the conduit. Optionally, the tool 210 may also include a locking mechanism 216 that can be selectably engaged to secure the tool in position relative to the conduit. The locking mechanism 216 may be configurable between a locked position, in which the tool 210 can move relative to the conduit 102, and a locked position, in which movement between the tool 210 and the conduit 102 is inhibited.

The boring tool 214 may be any type of device that is capable of forming the desired bore in the sidewall of the conduit, including, for example a cutting tool, a drill, a plasma cutter, a torch, a laser, an electro-discharge machining apparatus (EDM) and the like. The alignment tool 216 may be any type of device or mechanism that can help a user align the boring tool with a pre-determined target location on the inner surface of the conduit, where a bore is to be formed. The alignment tool 216 may include physical alignment members, a camera or other optical sensor, acoustic or light based measurement tools and the like.

In the illustrated example the tool includes a boring tool 214 in the form of an EDM, with an electrode tip 228, an alignment tool 216 in the form of a digital camera and a locking mechanism 217 that includes a plurality of deployable locking pins 218. The head 212 also includes a positioning cylinder 220, electrical power cord 222 (connected to a suitable power source 242—such as a battery and/or AC power from a wall outlet), a hydraulic connection 224 between the positioning cylinder 220 and a user controller master cylinder 226. The EDM 214 and camera 216 can be inserted into the interior of the pressure tube 102.

In accordance with one method of instrumenting the pressure tube with embedded thermocouples, the pressure tube 102 can be placed on a rotating table and then secured to prevent it from moving axially as it is rotated to draw the axial ring target locations (i.e. for the later placement of thermocouples) on the inner surface 108 of the tube 102. The center of the tube can be located and a marker can be placed at the axial mid-point of the pressure tube 102. Additional markings can be placed at other desired bore locations within the pressure tube 102. The markings can be provided using surface coatings, such as ink, or by scribing a mark into the surface of the pressure tube, or both (or by any other suitable marking mechanism that can be detected by the corresponding alignment tool).

After identifying the target locations, the head 212 of the tool can be inserted into the interior of the pressure tube 102. The camera can be used to scan the inner surface 108 to locate a marked target location for the installation of a thermocouple 166, and to guide the movement of the tool so that the EDM 214 is aligned with the target location.

When the EDM 214 is aligned with the target mark the head 212 can be locked in position using the locking pins 218. In the illustrated example, the locking pins can be extended in the generally radial direction between a retracted position, in which they are retracted away from the inner surface of the pressure tube, and an extended position, in which the pins press against the inner surface of the pressure tube. In the extended position, friction between the ends of the pins and the inner surface of the pressure tube can help lock the tool 210 in position. Movement of the pins 218 can be actuated using any suitable actuator, including, for example, hydraulic actuators, pneumatic actuators, electric solenoids, pressure switches, servo-motors, gears, linkages and the like. Optionally, the pins 218 may be biased toward one of the positions, such as the retracted position, so that the pins 218 can returned to the retracted position when the actuator is disengaged.

Optionally, the tool 210 can be equipped with a cooling system to help dissipate the heat generated by the boring process. The cooling system can be used to cool the inner surface of the pressure tube. Cooling the pressure tube during the boring process may help reduce unwanted heating of the pressure tube material, which could otherwise have an effect on its mechanical properties. In the illustrated example, the cooling system includes a water tank 236 that can be filled with a coolant (such as de-ionized water) and a nozzle 238 to discharge the coolant to help cool the bore when the EDM is in use. Optionally, when liquid cooling is used the pressure tube 102 may be positioned at a slight inclination during the boring process to help facilitate drainage of the coolant out of the pressure tube 102. Optionally, a collection tank 244 (or other suitable collection apparatus) can be positioned adjacent the pressure tube 102 to collect the coolant draining from the pressure tube 102.

The tool 210 can also include a display module 240, such as a television or computer monitor, that can be connected to the camera 216 (for example wirelessly or with a wired connection) to display the images captured by the camera 216 to the tool operator.

When the tool 210 is secured to the pressure tube 102, cooling water supply is turned on; the EDM 214 can be activated to create the desired bore (such as bore 172). Preferably, the tool 210 can also include a measurement instrument, such as a micrometer 230, to help feed the electrode tip 228 to the desired depth of the bore as it is being formed. Optionally, after the bores are formed the inside surface of the pressure tube 102 can be cleaned with suitable solvents, such as acetone, isopropyl alcohol and water, to help prepare the pressure tube for testing.

Thermocouples 166 can then be inserted into respective ones of the bores and their leads 168 can be cut to the desired length, swaged and the junctions made. The thermocouple leads 168 can be straightened to required length within the pressure tube and then a 4" section can be used to make a series of loops along the length of the wire (not shown).

Preferably, the loops are arranged to lay flat and such loops may provide the slack required to accommodate pressure tube axial expansion during heating, as described herein.

Once inserted into the corresponding bore 172, the positioning of the thermocouple can be checked to help ensure that the bead portion 164 is located in the corresponding cavity portion 158 of the bore 172, and that it is sufficiently buried/embedded within the sidewall 152 by marking the desirable depth of insertion on the thermocouple 166 with a suitable marker ink and ensure this mark reaches the aperture 176 with the digital camera 216. To help secure the thermocouple in place, a first tab 232 (see FIG. 3—e.g. a thin zircaloy sheath about 5 mm by about 10 mm) can be spot-welded (spot welder at 800 amps) to the inner surface about 10 mm away from the aperture 176 to help bond the thermocouple 166 to the pressure tube 102. The rest of the length of the lead 168 can be spot-welded to the pressure tube at suitable attachment locations until the thermocouple lead is fastened to the pressure tube up to the thermal insulation disks 150 in the test apparatus. This process can be repeated for each thermocouple embedded in the pressure tube.

In the illustrated example, the boring tool 214 is rigidly connected to the head 212. In this arrangement, boring tool 214 is locked in position when the locking pins 218 engage the inner surface of the pressure tube 102. This can help keep the boring tool 214 in its desired location. Alternatively, while illustrated in a generally fixed arrangement, in other embodiments the boring tool and/or the alignment tool may be movably connected to the head such either tool may be movable relative to the head when the head is locked to the pressure tube via the locking pins. This may allow further adjustment of the boring tool location when the head is locked in position.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A combination of a conduit and a sensor, the combination comprising:
   (a) the conduit extending along a conduit axis between a first end and a second end and comprising a sidewall with an inner surface and an opposed outer surface spaced apart from the inner surface in a radial direction;
   (b) at least a first cavity disposed in the sidewall, the first cavity comprises an inner cavity surface comprising a first base surface portion and an opposing first cover surface portion disposed radially between the first base surface portion and the first inner surface so that a first portion of the sidewall is provided radially between the first cover surface portion and the inner surface;
   (c) a first aperture in the inner surface, the first aperture is in communication with the first cavity and is axially spaced apart from the first cover surface portion; and
   (d) the first sensor having a transducer portion insertable through the first aperture and positioned within the first cavity, the transducer portion being disposed radially between the first base surface portion and the first cover surface portion and being axially spaced apart from the first aperture.

2. The combination of claim 1, wherein the first cavity and the first aperture are part of a common linear bore formed in the conduit sidewall, and wherein the conduit comprises a conduit length and a conduit diameter and a ratio of the conduit length to the conduit diameter is between 8:1 and 50:1.

3. The combination of claim 1, wherein the bore has a bore diameter that is between 0.2 mm and 1.0 mm.

4. The combination of claim 1, wherein the first sensor comprises a lead portion connected to the transducer and extending through the first aperture and along the inner surface from the first cavity toward the first end of the conduit, and wherein the lead occupies substantially all of the cross-sectional area of the cavity.

5. The combination of claim 1, wherein the first sensor comprises an Inconel-clad type K thermocouple provided with magnesium oxide thermal insulation.

6. The combination of claim 1, further comprising a second cavity disposed in the sidewall and being circumferentially spaced apart from the first cavity, the second cavity comprising a second base surface portion and an opposing second cover surface portion disposed radially between the second base surface portion and the inner surface so that a second portion of the sidewall is provided radially between the second cover surface portion and the inner surface;
   (a) a second aperture in the inner surface, the second aperture is in communication with the second cavity and is axially spaced apart from the second cover surface portion; and
   (b) a second sensor having a second transducer portion insertable through the second aperture and positioned within the second cavity, the second transducer portion being disposed radially between the second base surface portion and the second cover surface portion and being axially spaced apart from the second aperture.

7. A test apparatus comprising:
   (a) a first conduit extending along a conduit axis and having a first sidewall with a first inner surface and an opposing first outer surface spaced apart from the first inner surface in a radial direction;
   (b) a second conduit disposed within the first conduit and comprising a second sidewall with a second inner surface and an opposed second outer surface radially spaced apart from and facing the first inner surface;
   (c) a heater disposed within the second conduit;
   (d) at least a first cavity disposed in the second sidewall, the first cavity comprises an inner cavity surface comprising a first base surface portion and an opposing first cover surface portion disposed radially between the base surface portion and the first inner surface so that a first portion of the second sidewall is provided radially between the first cover surface portion and the heater;
   (e) a first aperture in the second inner surface, the first aperture being in communication with the first cavity and being axially spaced apart from the first cover surface portion; and a first sensor having a transducer portion insertable through the first aperture and positioned within the first cavity, the transducer portion being disposed radially between the first base surface portion and the first cover surface portion and being axially spaced apart from the first aperture whereby the first portion of the sidewall shields the transducer from heat radiating from the heater.

8. The test apparatus of claim 7, wherein the first cavity and the first aperture are part of a common linear bore formed in the second sidewall.

9. The test apparatus of claim 8, wherein the bore has a bore diameter that is between 0.2 mm and 1.0 mm.

10. The test apparatus of claim 7, wherein the second sidewall has a thickness in the radial direction and the transducer portion is spaced apart from the second inner surface by a transducer offset distance that is between 40% and 80% of the thickness.

11. The test apparatus of claim 7, wherein the first sensor comprises a lead portion connected to the transducer and extending through the first aperture and along the second inner surface from the first cavity toward an end of the second conduit and wherein the first cavity is located a first distance from the end of the second conduit and the lead has a length that is greater than the first distance.

12. The test apparatus of claim 7, further comprising a first external sensor provided on the first outer surface, the first external sensor overlying the first sensor.

13. The test apparatus of claim 7, wherein the second outer surface directly faces the first inner surface, and an annular gap defined between the second outer surface and the first inner surface is free from obstructions.

14. The test apparatus of claim 7, further comprising a vessel containing a liquid and wherein at least a portion of the first conduit is submerged in the liquid.

15. The test apparatus of claim 7, wherein an interior of the inner conduit is sealed and further comprising a gas supply connected to the interior of the inner conduit to pressurize the interior of the inner conduit.

16. A method of making an instrumented elongate conduit, the method comprising:

(a) axially inserting a tool into an interior of an elongate conduit, the tool comprising a boring tool;
(b) forming a bore in a sidewall of the conduit using the a boring tool, the bore extending from an aperture in an inner surface of the sidewall to a closed end within the sidewall and comprising a cavity that is axially spaced apart from aperture and comprises an inner cavity surface that has a base surface portion and a cover surface portion positioned radially between the base surface portion and the inner surface of the conduit;
(c) inserting a transducer portion of a sensor through the aperture and into the cavity;
(d) positioning the transducer portion within the cavity to be radially between the base surface portion and the cover surface whereby a portion of the sidewall is disposed radially between the transducer portion and the inner surface.

17. The method of claim 16, further comprising inserting a camera into the conduit to locate a pre-marked target location and aligning the boring tool with the pre-marked target location.

18. The method of claim 16, further comprising locking the boring tool to the conduit to inhibit axial movement of the boring tool relative to the conduit before forming the bore.

19. The method of claim 18, wherein locking the boring tool comprises extending at least two locking pins from the tool to bear against the inner surface of the conduit, and unlocking the boring tool comprises retracting the at least two locking pins away from the inner surface.

20. The method of claim 16, wherein the tool comprises a display module that is spaced apart from boring tool and remains external the conduit while forming the bore.

* * * * *